(12) United States Patent
Cremer et al.

(10) Patent No.: US 11,134,314 B2
(45) Date of Patent: *Sep. 28, 2021

(54) DISPLAYING AN ACTIONABLE ELEMENT OVER PLAYING CONTENT

(71) Applicant: Roku, Inc., San Jose, CA (US)

(72) Inventors: Markus K. Cremer, Emeryville, CA (US); Wilson Harron, Berkeley, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,870

(22) Filed: Mar. 3, 2021

(65) Prior Publication Data

US 2021/0185399 A1 Jun. 17, 2021

Related U.S. Application Data

(63) Continuation of application No. 16/178,116, filed on Nov. 1, 2018, now Pat. No. 10,965,992, which is a
(Continued)

(51) Int. Cl.
*H04N 21/4722* (2011.01)
*H04N 21/442* (2011.01)
(Continued)

(52) U.S. Cl.
CPC ..... *H04N 21/4722* (2013.01); *H04N 21/4316* (2013.01); *H04N 21/44008* (2013.01);
(Continued)

(58) Field of Classification Search
CPC ......... H04N 21/4316; H04N 21/44008; H04N 21/44222; H04N 21/4532; H04N 21/4622;
(Continued)

(56) References Cited

U.S. PATENT DOCUMENTS 10,965,991 B2 * 3/2021 Cremer .............. H04N 21/4622
10,965,992 B2 * 3/2021 Cremer .............. H04N 21/8133
(Continued)

OTHER PUBLICATIONS

Non-Final Office Action from U.S. Appl. No. 14/020,295, dated Oct. 23, 2015.
(Continued)

*Primary Examiner* — Farzana Hossain
(74) *Attorney, Agent, or Firm* — McDonnell Boehnen Hulbert & Berghoff LLP

(57) ABSTRACT

Example methods and systems for displaying actionable elements over playing content, such as video content, are described. In some example embodiments, the methods and systems identify video content currently playing within a display environment provided by a playback device, and display an actionable element within the display environment provided by the playback device that is based on the identified video content and includes one or more user-selectable options to perform an action associated with the identified video content. Further, in some example embodiments, the methods and systems may perform an action (e.g., present supplemental content and/or information) in response to a selection of one or more of the user-selectable options.

20 Claims, 11 Drawing Sheets

Related U.S. Application Data continuation of application No. 14/020,295, filed on Sep. 6, 2013, now Pat. No. 10,965,991.

(51) Int. Cl.

| | | |
|---|---|---|
| *H04N 21/45* | (2011.01) | |
| *H04N 21/81* | (2011.01) | |
| *H04N 21/44* | (2011.01) | |
| *H04N 21/8352* | (2011.01) | |
| *H04N 21/431* | (2011.01) | |
| *H04N 21/462* | (2011.01) | |

(52) U.S. Cl.
CPC ... *H04N 21/44222* (2013.01); *H04N 21/4532* (2013.01); *H04N 21/4622* (2013.01); *H04N 21/8133* (2013.01); *H04N 21/8352* (2013.01)

(58) Field of Classification Search
CPC .......... H04N 21/4722; H04N 21/8133; H04N 21/8352
See application file for complete search history.

(56) References Cited

U.S. PATENT DOCUMENTS

| | | | |
|---|---|---|---|
| 10,979,771 B2* | 4/2021 | Cremer | H04N 21/8352 |
| 2001/0001160 A1 | 5/2001 | Shoff et al. | |
| 2006/0126932 A1 | 6/2006 | Eschbach | |
| 2006/0187358 A1 | 8/2006 | Lienhart et al. | |
| 2006/0248569 A1 | 11/2006 | Lienhart et al. | |
| 2007/0226761 A1 | 9/2007 | Zalewski et al. | |
| 2008/0066100 A1 | 3/2008 | Brodersen et al. | |
| 2009/0083140 A1 | 3/2009 | Phan | |
| 2010/0131847 A1 | 5/2010 | Sievert et al. | |
| 2010/0247061 A1 | 9/2010 | Bennett et al. | |
| 2010/0251304 A1 | 9/2010 | Donoghue et al. | |
| 2011/0166932 A1 | 7/2011 | Smith et al. | |
| 2012/0075526 A1 | 3/2012 | DeHaan et al. | |
| 2012/0117584 A1 | 5/2012 | Gordon | |
| 2012/0240162 A1 | 9/2012 | Rose | |
| 2013/0097637 A1 | 4/2013 | Etheredge et al. | |
| 2013/0198642 A1 | 8/2013 | Carney et al. | |
| 2014/0304731 A1 | 10/2014 | Dhawan et al. | |
| 2014/0359656 A1 | 12/2014 | Banica et al. | |
| 2015/0074703 A1 | 3/2015 | Cremer et al. | |
| 2016/0037202 A1 | 2/2016 | Kim et al. | |
| 2018/0288494 A1 | 10/2018 | Grover | |
| 2018/0307300 A1 | 10/2018 | Benson et al. | |
| 2019/0007741 A1 | 1/2019 | Cremer et al. | |
| 2019/0007742 A1* | 1/2019 | Cremer | H04N 21/4316 |
| 2019/0075362 A1 | 3/2019 | Cremer et al. | |
| 2021/0185398 A1* | 6/2021 | Cremer | H04N 21/4316 |

OTHER PUBLICATIONS

Final Office Action from U.S. Appl. No. 14/020,295, dated Feb. 24, 2016.
Non-Final Office Action from U.S. Appl. No. 14/020,295, dated Jul. 26, 2016.
Final Office Action from U.S. Appl. No. 14/020,295, dated Feb. 8, 2017.
Non-Final Office Action from U.S. Appl. No. 14/020,295, dated Jun. 9, 2017.
Final Office Action from U.S. Appl. No. 14/020,295, dated Oct. 4, 2017.
Appeal Brief to the U.S. Appl. No. 14/020,295, dated Mar. 2, 2018.
Reply Brief to the U.S. Appl. No. 14/020,295, dated Jun. 22, 2018.
Non-Final Office Action from U.S. Appl. No. 16/124,928, dated Apr. 30, 2019.
Non-Final Office Action from U.S. Appl. No. 16/126,771, dated Apr. 30, 2019.
Non-Final Office Action from U.S. Appl. No. 16/178,116, dated Apr. 30, 2019.
Final Office Action from U.S. Appl. No. 16/124,928, dated Sep. 17, 2019.
Final Office Action from U.S. Appl. No. 16/126,771, dated Sep. 17, 2019.
Non-Final Office Action from U.S. Appl. No. 16/178,116, dated Sep. 17, 2019.
Non-Final Office Action from U.S. Appl. No. 16/124,928, dated Mar. 13, 2020.
Non-Final Office Action from U.S. Appl. No. 16/126,771, dated Mar. 18, 2020.
Final Office Action from U.S. Appl. No. 16/178,116, dated Mar. 13, 2020.
Decision on Appeal to the U.S. Appl. No. 14/020,295, dated Mar. 31, 2020.
Non-Final Office Action from U.S. Appl. No. 14/020,295, dated Jul. 6, 2020.
Final Office Action from U.S. Appl. No. 16/124,928, dated Jul. 6, 2020.
Final Office Action from U.S. Appl. No. 16/126,771, dated Jul. 6, 2020.
Non-Final Office Action from U.S. Appl. No. 16/178,116, dated Jul. 6, 2020.
Final Office Action from U.S. Appl. No. 14/020,295, dated Nov. 6, 2020.
Non-Final Office Action from U.S. Appl. No. 16/124,928, dated Nov. 16, 2020.
Final Office Action from U.S. Appl. No. 16/178,116, dated Nov. 16, 2020.
Non-Final Office Action from U.S. Appl. No. 16/126,7711, dated Dec. 3, 2020.

* cited by examiner

DISPLAYING AN ACTIONABLE ELEMENT OVER PLAYING CONTENT

CROSS-REFERENCE TO RELATED APPLICATIONS

This disclosure is a continuation of, and claims priority to U.S. patent application Ser. No. 16/178,116 filed Nov. 1, 2018, which is a continuation of, and claims priority to, U.S. patent application Ser. No. 14/020,295 filed Sep. 6, 2013, the entire contents of each of which are hereby incorporated by reference.

TECHNICAL FIELD

The subject matter disclosed herein generally relates to the processing of data. Specifically, the present disclosure addresses systems and methods for displaying an actionable element over playing content.

BACKGROUND

Typical devices that present video content, such as televisions, laptops, mobile devices, and so on, provide users with ways to interact with their viewing experiences. For example, a conventional television or associated set-top box displays a navigation element that facilitates the navigation from one channel to another (e.g., via a displayed channel guide) and/or the selection of content (e.g., via an on-demand service) for consumption. Thus, these conventional devices often only provide viewers with ways to browse or select the content that is presented by the devices.

BRIEF DESCRIPTMN OF THE DRAWINGS

Some embodiments are illustrated by way of example and not limitation in the figures of the accompanying drawings.

DETAILED DESCRIPTION

Overview

Figure 1:
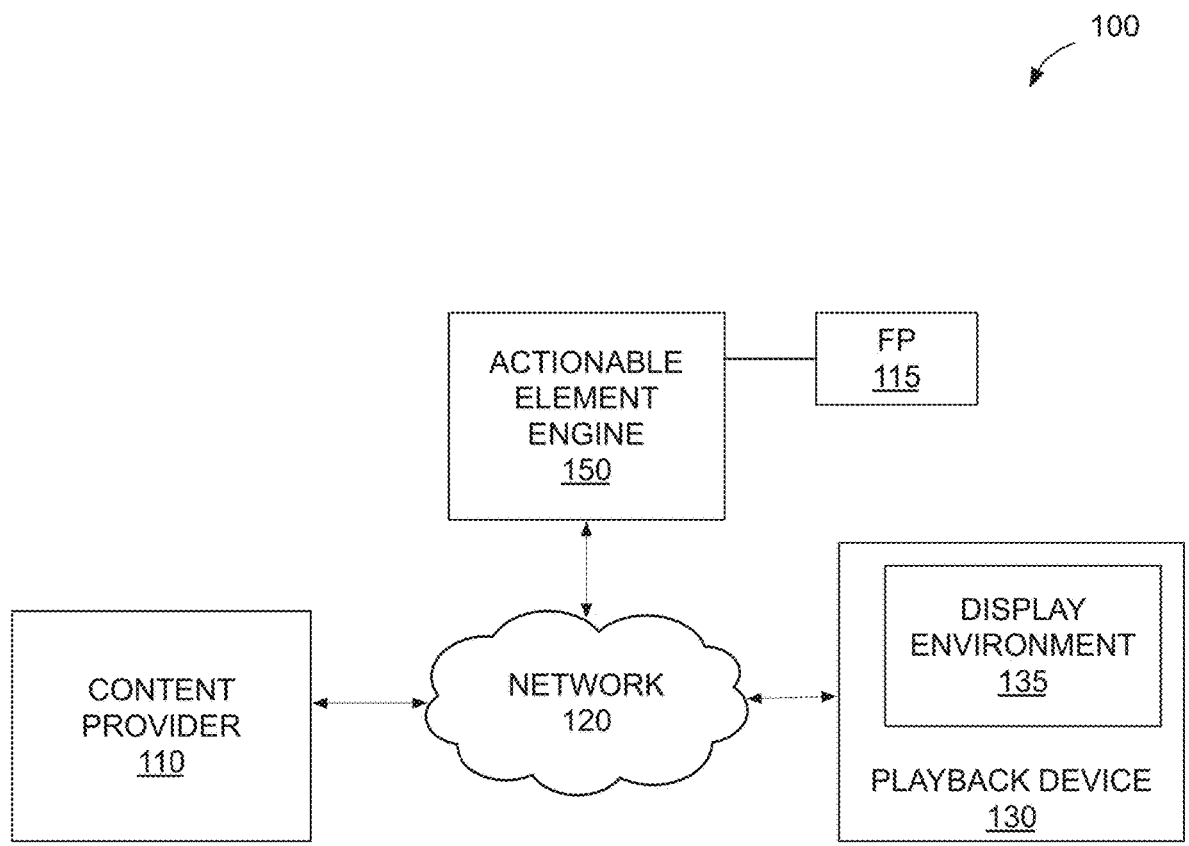
FIG. 1 is a network diagram illustrating a network environment suitable for displaying actionable elements over playing content, according to some example embodiments.

Example methods and systems for displaying actionable elements over playing content, such as video content, are described. In some example embodiments, the methods and systems identify video content currently playing within a display environment provided by a playback device, and display an actionable element within a display environment provided by the playback device that is based on the identified video content and includes one or more user-selectable options to perform an action associated with the identified video content. Further, in some example embodiments, the methods and systems may perform an action (e.g., present supplemental content and/or information) in response to a selection of one or more of the user-selectable options.

For example, the methods and systems may identify a television show or sporting event presented by a television, and display an actionable element (e.g., a channel bar) on or proximate to a generic navigation bar provided by the television. The actionable element may include user-selectable options to perform actions that are based on the identified show or event. For example, when the presented content is a television show, the actionable element may include a user-selectable option to present other video content associated with the television show, such as other episodes of the show, other shows that include the same actors, and so on. As another example, when the presented content is a sporting event, the actionable element may include a user-selectable option to present information about or associated with the event, such as game or player statistics, information associated with web-based contents that relate to the sporting event (e.g., fantasy sports information), associated video content (e.g., replays retrieved from web-based resources), and so on. It should however be noted that the methods and systems described herein are not limited to television content. Accordingly, in example embodiments the video content may be streamed via a network (e.g., the Internet) to one or more computing devices (e.g., a desktop computer, a smartphone, a tablet computer, or any other display environment). Further, the duration of the video content may vary. For example, the video content may be a short video clip (e.g., a few seconds in length), of longer duration (e.g., a music video that may be several minutes long), or of any other duration.

The example methods and systems may, therefore, enable a viewer of video content to select and consume various types of information and content that is associated with, but different from, the primary content provided by a content provider, such as a cable provider, web-based resource, and so on. Further, by providing a dynamically configured and/or located actionable element via which a viewer can select the additional content or information, the example methods and systems provide the viewer with easy and unobstrusive access to such content, thus, enhancing their viewing experience without distracting them from the primary content, among other things.

In the following description, for purposes of explanation, numerous specific details are set forth to provide a thorough understanding of example embodiments. It will be evident to one skilled in the art, however, that the present subject matter may be practiced without these specific details.

Example Network Environment

FIG. 1 is a network diagram illustrating a network environment 100 suitable for displaying actionable elements over playing content, according to some example embodiments. The network environment 100 may include a content provider 110 or content source (e.g., a broadcaster, a cable system, a network, a website, and so on), that provides various types of multimedia content, such as audio content and/or video content. Example content providers 110 may include terrestrial or satellite radio stations, online music services, online video services, television broadcasters and/or distributors (e.g. cable or satellite television providers), networked computing devices (e.g., mobile devices on a network), local audio or music applications, and so on.

A playback device 130 may receive a stream or streams of content from the content provider 110 over a network 120, such as the Internet. The network 120 may be any network or communication medium that enables communication between the content provider 110, the playback device 130, and other networked devices. The network 120, therefore, may be or include a wired network, a wireless network (e.g., a mobile network), a radio or telecommunications network, a satellite network, a cable network, and so on. For example, the network 120 may include one or more portions that constitute a private network (e.g., a cable television network or a satellite radio network), a public network (e.g., over-the-air broadcast channels or the Internet), and so on.

The playback device 130 may include audio or video playback devices, such as televisions, set-top boxes, laptops and other personal computers, tablets and other mobile devices (e.g., smart phones), gaming devices, and/or other devices capable of receiving and presenting audio, video, and/or other multimedia content. In some example embodiments, the playback device 130 may include a tuner configured to receive a stream of audio or video content and play the stream of audio or video content by processing the stream and outputting information (e.g., digital or analog) usable by a display of the playback device 130 to present or play back the audio or video content to a user associated with the playback device 130. The playback device 130 may also include a display environment 135 or other user interface configured to display the processed stream of content and/or associated metadata. The playback device 130 may present the display environment 135 via one or more display components, such as a touch screen, a flat-panel screen, a plasma screen, a light emitting diode (LED) screen, a cathode ray tube (CRT), a liquid crystal display (LCD), a projector, and so on.

In some example embodiments, an actionable element engine 150 (e.g., residing on a remote server) may access, over the network 120, a stream of content provided by the content provider 110), and perform various algorithmic processes to identify the content and render an actionable element (e.g., a channel bar or other user interface (UI) element) that is based on the identified content. For example, the actionable element engine 150 may identify the stream of content (e.g., using audio or video fingerprint comparisons), and display an actionable element within the display environment 135 provided by the playback device 130 that includes user-selectable options for performable actions associated with the identified content.

In some example embodiments, the actionable element engine 150 and/or the playback device 130 may include one or more fingerprint generators 115 configured to generate identifiers for content being transmitted or broadcast by the content provider 110 and/or received or accessed by the playback device 130. For example, the fingerprint generators 115 may include a reference fingerprint generator (e.g., a component that calculates a hash value from a portion of known video content) that is configured to generate reference fingerprints or other identifiers of received content, among other things.

Thus, in some example embodiments, the actionable element engine 150 includes components, modules, and/or devices that identify content provided by the content provider 110 and/or playing within the display environment 135 of the playback device 130, and includes components, modules, and/or devices that render and/or display (or, cause to be displayed) an actionable element with the display environment 135, which facilitates user/viewer selections of actions to be performed that are associated with and/or based on the identified content, such as actions performed to display additional and/or supplemental content within the display environment 135, actions performed to display information associated with playing content within the display environment 135, and so on.

Furthermore, in some example embodiments, the actionable element engine 150 may include components, modules, and/or devices that determine a suitable location within the display environment 135 at which to display the actionable element, such as a location over and/or proximate to a channel bar (e.g., navigation element) native to the playback device 130, a location associated with a black bar or other area within the display environment 135 that does not include content, and so on.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed, below with respect to FIG. 8. As used herein, a "database" is a data storage resource and may store data structured as a text file, a table, a spreadsheet, a relational database, a triple store or other database of triples, or any suitable combinations thereof. Moreover, any two or more of the machines illustrated in FIG. 1 may be combined into a single machine, and the functions described herein for any single machine may be subdivided among multiple machines.

Furthermore, any of the modules, systems, engines, and/or generators may be located at any of the machines, databases, or devices shown in FIG. 1. For example, the actionable element engine 150 may be part of the content provider 110 and/or the playback device 130. As another example, the playback device 130 may include the content provider 110 (e.g., the playback device 130 is a laptop that stores video files), among other configurations.

Examples of Displaying Actionable Elements Over Playing Content

As described herein, in some example embodiments, the systems and methods dynamically configure actionable elements based on knowledge of currently playing content (e.g., a currently playing show, movie, event, and so on), and display the actionable elements at determined locations within a display environment 135 that is playing the content, among other things.

Figure 2:
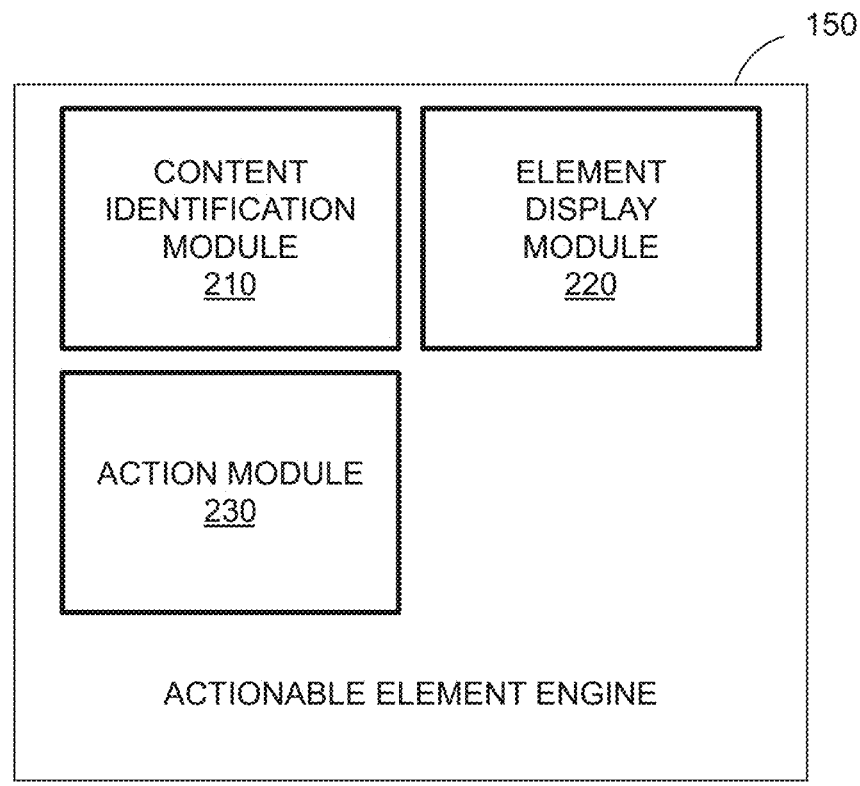
FIG. 2 is a block diagram illustrating components of an actionable element engine, according to some example embodiments.

FIG. 2 is a block diagram illustrating components of the actionable element engine 150, according to some example embodiments. One or more of the modules described herein may be implemented using hardware (e.g., a processor of a machine) or a combination of hardware and software. Moreover, any two or more of these modules may be combined into a single module, and the functions described herein for a single module may be subdivided among multiple modules. Referring to FIG. 2, the actionable element engine 150 may include a content identification module 210, an element display module 220, and an action module 230.

In some example embodiments, the content identification module 210 is configured and/or programmed to identify video content currently playing within the display environment 135 provided by the playback device 130.

For example, the content identification module 210 may access a stream of content from the content provider 110 to the playback device 130 over the network 120. As another example, the content identification module 210 may access a stream of content that is locally stored by the playback device 130.

The content identification module 210 may access various types of content streams, such as video content streams, audio content streams, and so on. For example, the content identification module 210 may access a stream of video content provided by a cable or satellite broadcasting system, a web-based content provider (e.g., Netflix), and so on.

The content identification module 210 may identify content, such as content currently playing within the display environment 135, using a variety of processes, including processes that compare a fingerprint for the content to reference fingerprints of known content (e.g., reference fingerprints generated by the reference fingerprint generator 115). For example, the content identification module 210 may generate and/or access query fingerprints for a frame or block of frames of the content, and perform a comparison of the query fingerprints to the reference fingerprints in order to identify the content and/or a specific location within the content (e.g., a frame or block of frames) currently playing within the display environment 135.

In some example embodiments, the content identification module 210 may identify content using information associated with the content. For example, the content identification module 210 may identify the content using metadata (e.g., title information, time or date information, actor information, episode or other hierarchy information, and so on) that is associated with and/or provided with the content.

In some example embodiments, the element display module 220 is configured and/or programmed to display an actionable element within a display environment 135 provided by the playback device 130 that is based on the identified video content and that includes one or more user-selectable options to perform an action associated with the identified video content. For example, the element display module 220 may render, generate, modify, and/or cause to be displayed an actionable element, such as a channel bar or other user interface element, having a configuration that is based on the identified video content and/or on a location within the display environment 135 at which the actionable element is to be displayed.

The element display module 220 may display an actionable element that includes user-selectable options for actions to be performed that are specific to and/or associated with the identified video content, such as actions associated with retrieving and presenting other video content that is related to the identified video content, actions associated with retrieving and presenting information that is related to the identified video content, and so on.

In some example embodiments, the action module 230 is configured and/or programmed to receive a selection of a user-selectable option of the actionable element and perform an action associated with the selected option. For example, the action module 230 may retrieve other video content and/or information related to the identified video content from a web-based resource (e.g., over the network 120) and cause the video content and/or information to be presented within the display environment 135 provided by the playback device 130. The action module 230 may present the retrieved content and/or information such that a viewer of the playback device 130 may interact with the presented content and/or information, such as by using a remote control or other selection device to navigate within the content and/or information, navigate to other content and/or information, move the displayed content and/or information to other locations within the display environment 135, exit out of the displayed content and/or information, save the displayed content and/or information, send a message with the displayed content and/or information, post and/or blog about the displayed content and/or information, and so on.

Thus, in some example embodiments, the actionable element engine 150 performs various processes and/or methods in order to display an actionable element that is dynamically configured to provide user-selectable options to obtain content and/or information that supplements currently playing content within the display environment 135 of the playback device 130, among other things.

Figure 3:
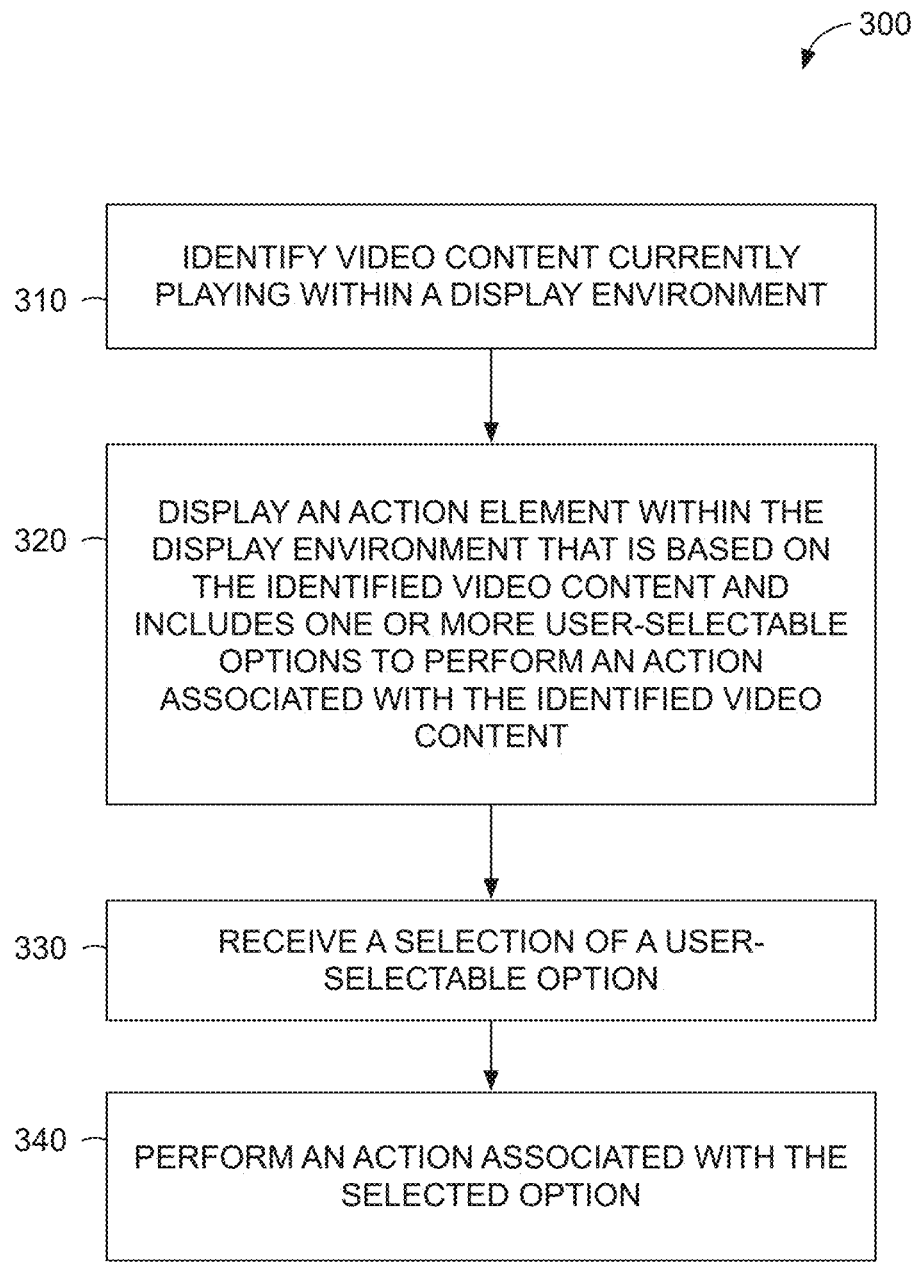
FIG. 3 is a flow diagram illustrating an example method for displaying an actionable element along with content playing via a playback device, according to some example embodiments.

FIG. 3 is a flow diagram illustrating an example method 300 for displaying an actionable element along with content playing via the playback device 130, according to some example embodiments. The method 300 may be performed by the actionable element engine 150 and, accordingly, is described herein merely by way of reference thereto. It will be appreciated that the method 300 may be performed on any suitable hardware.

In operation 310, the actionable element engine 150 identifies video content currently playing within a display environment 135 provided by a playback device 130. For example, the content identification module 210 may identify the content using a variety of processes, including processes that compare a fingerprint for the content to reference fingerprints of known content (e.g., reference fingerprints generated by the reference fingerprint generator 115). For example, the content identification module 210 may generate and/or access query fingerprints for a frame or block of frames of the content, and perform a comparison of the query fingerprints to the reference fingerprints in order to identify the content and/or a specific location within the content (e.g., a frame or block of frames) currently playing within the display environment 135. As another example, the content identification module 210 may identify the content using metadata (e.g., title information, time or date information, actor information, episode or other hierarchy information, and so on) that is associated with and/or provided with the content.

In operation 320, the actionable element engine 150 displays an actionable element within the display environment 135 provided by the playback device 130 that is based on the identified video content and includes one or more user-selectable options to perform an action associated with the identified video content. For example, the element display module 220 may render, generate, modify, and/or cause to be displayed an actionable element, such as a channel bar or other user interface element, having a configuration that is based on the identified video content and/or on a location within the display environment 135 at which the actionable element is to be displayed.

As described herein, in some example embodiments, the actionable element engine 150 may perform various processes and/or methods to determine a suitable location within the display environment 135 at which to display the actionable element.

Figure 4:
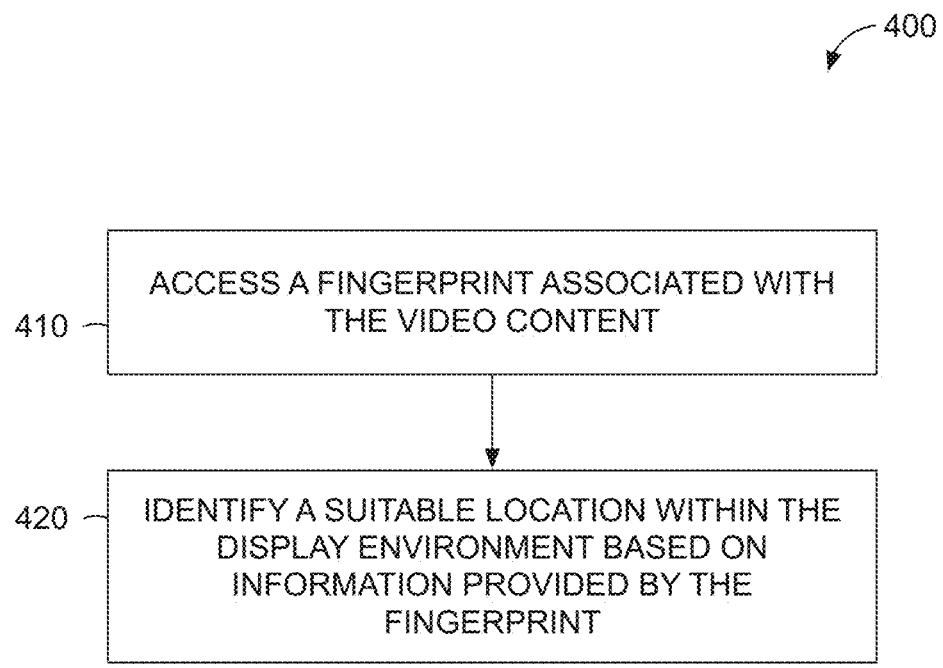
FIG. 4 is a flow diagram illustrating an example method for determining a location at which to display an actionable element, according to some example embodiments.

FIG. 4 is a flow diagram illustrating an example method 400 for determining a location at which to display an actionable element, according to some example embodiments. The method 400 may be performed by the actionable element engine 150 and, accordingly, is described herein merely by way of reference thereto. It will be appreciated that the method 400 may be performed on any suitable hardware.

In operation 410, the actionable element engine 150 determines a location within the display environment 135 at which to display the actionable element based on information provided by a fingerprint associated with the video content. For example, the actionable element engine 150 may utilize information provided by fingerprints representing currently playing video content to identify a location within the display environment 135 that includes a displayed navigation element native to the playback device 130, a location associated with a black bar or other area within the display environment 135 that does not include content (or content considered to be less relevant), a location within the playing content that is monochromatic in color or has low contrast between pixels, and so on.

In some example embodiments, the actionable element engine 150 may utilize other information to identify a location within the display environment 135 that includes a native channel bar or other features, such as rendering information associated with the playback device 130 that identifies the pixels and/or coordinates of the display environment 135 at which a native channel bar is displayed, among other things. In an example embodiment, details (e.g., positioning) of a native channel bar may be determined at the display device based on display capabilities of the playback device.

In operation 420, the actionable element engine 150 displays the actionable element at, or proximate to, the determined location. For example, the actionable element engine 150 may display the actionable element, or a portion of the actionable element, over and/or proximate to a channel bar that is native and/or displayed within the display environment 135, among other locations.

It should be noted that analysis of the video content to determine, for example, the position of the overlay, the color, or the like (e.g., using the actionable element engine 150) could be performed at a remote server, and the resulting data data may then be delivered to the playback device 130 after successful identification of the video content and/or a portion of the video content. Accordingly, improvements to the algorithms would not require an update or change at the playback device 130. In an example embodiment, basic browser functionality embedded in television sets access the remote server to obtain data from remotely executed algorithms that are always current, and do not share the narrow platform constraints of the playback device 130. In an example embodiment, a hybrid architecture is used where some basic elements are identified/processed on the client (e.g. black bar detection, or shot change detection), while more complex analysis is performed on the server side (e.g. finding a portion of the image with most consistent background, and no faces or other relevant objects in it).

Figure 5A:
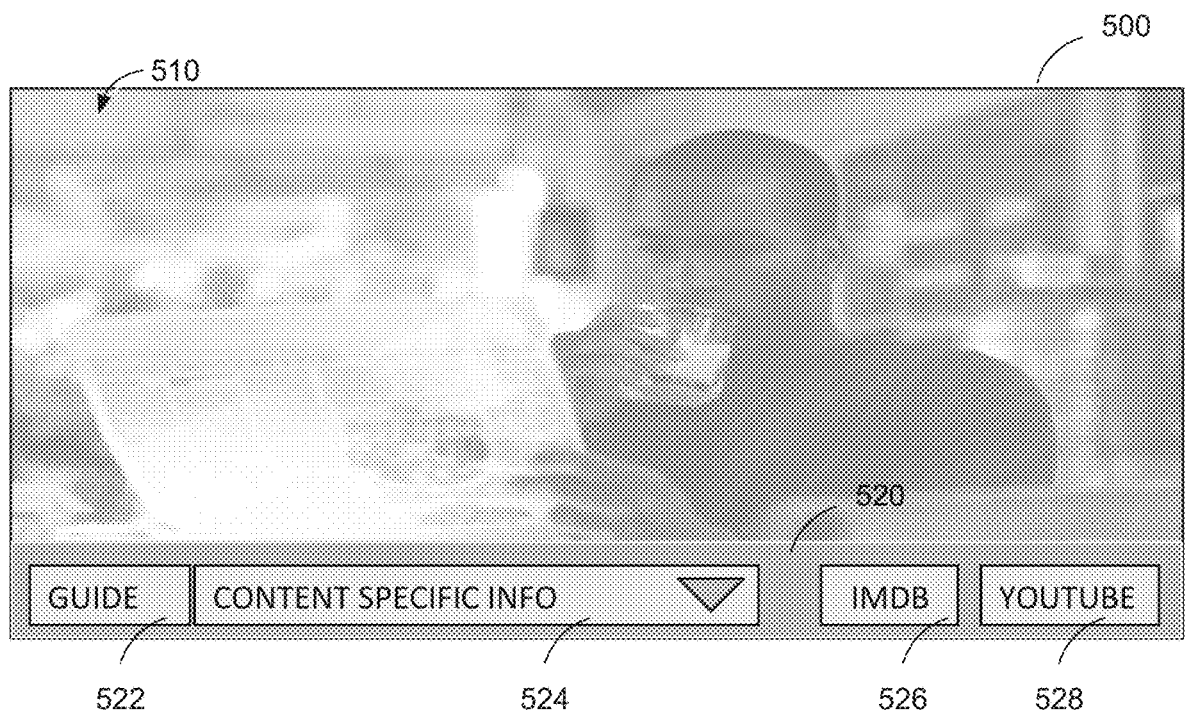
FIGS. 5A-5B are display diagrams illustrating the display of actionable elements within a display environment of a display device, according to some example embodiments.
Figure 5B:
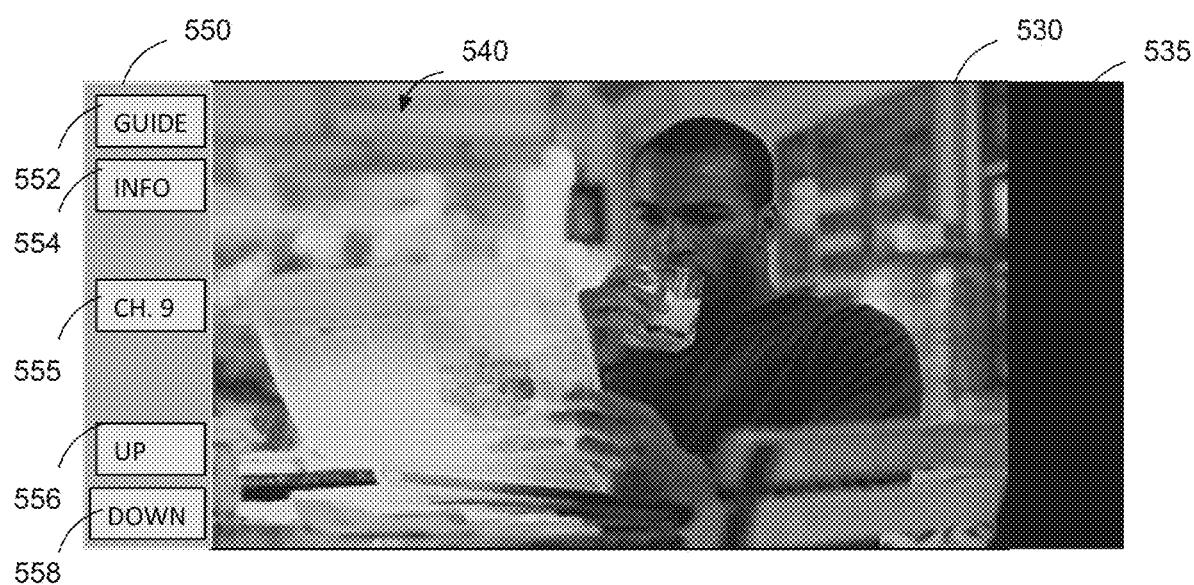

For example, FIGS. 5A-5B are display diagrams illustrating the display of actionable elements within the display environment 135 of the playback device 130. FIG. 5A is a display diagram that depicts video content 510 playing within a display environment 500 provided by the playback device 130. The display diagram includes an actionable element 520 that is displayed over a location within the display environment 500 that typically includes a navigation element provided by the playback device 130. The actionable element 520 includes various user-selectable options, elements, and/or buttons for performing actions associated with the playing video content 510, such as a user-selectable option 526 that, when selected, performs an action to display a webpage that provides information about the video content 510 and a user-selectable option 528 that, when selected, performs an action to present video content that is related to the video content 510.

Additionally, the actionable element 520 may include other user-selectable options, such as options associated with a viewer interacting with the video content 510. For example, the actionable element 520 may include a user-selectable option 522 that, when selected, displays a channel guide and a user-selectable option 524 that, when selected, provides information about the video content 510, among other things.

FIG. 5B is a display diagram that also depicts video content 540 playing within a display environment 530 provided by the playback device 130. The display diagram includes an actionable element 550 that is displayed over a black bar 535 within the display environment 530. The actionable element 550 includes various user-selectable options, elements, and/or buttons for performing actions associated with the video content 540, such as a user-selectable option 554 that, when selected, performs an action to present information retrieved from a web-based resource associated with the video content 540. Additionally, the actionable element 550 may include other user-selectable options, such as a user-selectable option 552 that, when selected, displays a channel guide, and user-selectable options 555, 556, and 558 that, when selected, facilitate navigation between channels provided within the display environment 530, among other things.

Of course, the actionable element engine 150 may display, or cause to display, the actionable element at various locations based on a variety of factors. For example, the actionable element engine 150 may display the actionable element at a location over or partially over a navigation element displayed by the playback device 130 within the display environment 135, at a location proximate to a navigation element displayed by the playback device 130 within the display environment 135, at a location within the display environment 135 that is selected by a viewer of the playback device 130, at a location within the display environment 135 that is associated with a low contrast between pixels of the video content, and so on.

In an example embodiment, the actionable element engine 130 (e.g., resident on a remote server) may target specific playback devices 130 based on context. Examples of context include which subscription(s) is/are associated with a particular playback device 130, which other media items have been consumed on the playback device 130, the version (e.g., hardware and/or software characteristics) of the playback device 130, or the like. Accordingly, a targeted advertisement and/or recommendation, may be communicated to the playback device 130. In an example embodiment, the actionable element engine 130 may target one or more playback devices 130 based on content source, as determined by the playback device 130. For example, an overlay may be generated for a TV series when broadcast, but not when displayed using a DVD player. As a further example, an overlay may be generated for a window of time (e.g. for up to two days after first airing on broadcast).

Figure 6:
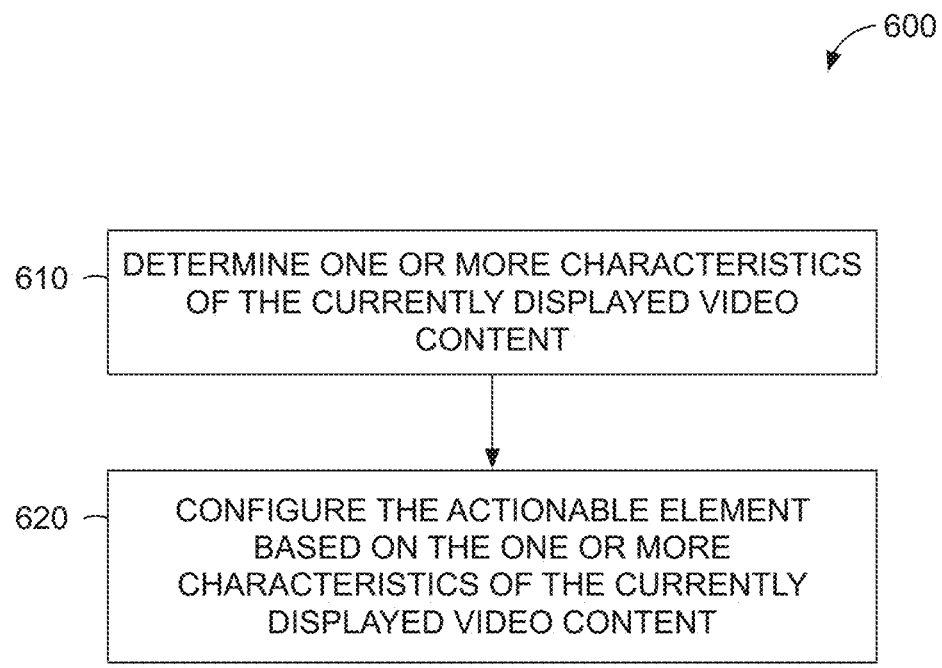
FIG. 6 is a flow diagram illustrating an example method for configuring a displayed actionable element, according to some example embodiments.

As described herein, in some example embodiments, the actionable element engine 150 may perform various processes and/or methods to configure the actionable element based on the video content. FIG. 6 is a flow diagram illustrating an example method 600 for configuring a displayed actionable element, according to some example embodiments. The method 600 may be performed by the actionable element engine 150 and, accordingly, is described herein merely by way of reference thereto. It will be appreciated that the method 600 may be performed on any suitable hardware.

In operation 610, the actionable element engine 150 determines one or more characteristics of the currently displayed video content. For example, the actionable element engine 150 may identify one or more color characteristics of the video content, may identify one or more high contrast (or low contrast) regions within the video content, may determine a depth pane of elements within the video content (e.g., a spatial 2 or 3 dimensional relationship between elements), and so on.

In operation 620, the actionable element engine 150 configures the actionable element based on the one or more characteristics of the currently displayed video content. For example, the actionable element engine 150 may render the actionable element with a certain color, geometry, shape, size, and so on, based on the characteristics of the video content.

In some example embodiments, such as when the characteristics of the video content change, the actionable element engine 150 may dynamically modify the configuration of the actionable element. For example, the actionable element engine 150 may identify different video content currently playing within the display environment 135 provided by the playback device 130, and modify the displayed actionable element to include one or more user-selectable options to perform an action associated with the identified different video content or to change the color and/or geometry of the actionable element, among other things.

Referring back to FIG. 3, in operation 330, the actionable element engine 150 receives a selection of a user-selectable option of the actionable element, and, in operation 340, performs an action associated with the selected option. For example, the action module 230 may retrieve other video content and/or information related to the identified video content (e.g., sharing similar metadata) from a web-based resource or other location over the network 120 and cause the video content and/or information to be presented within the display environment 135 provided by the playback device 130.

Figure 7A:
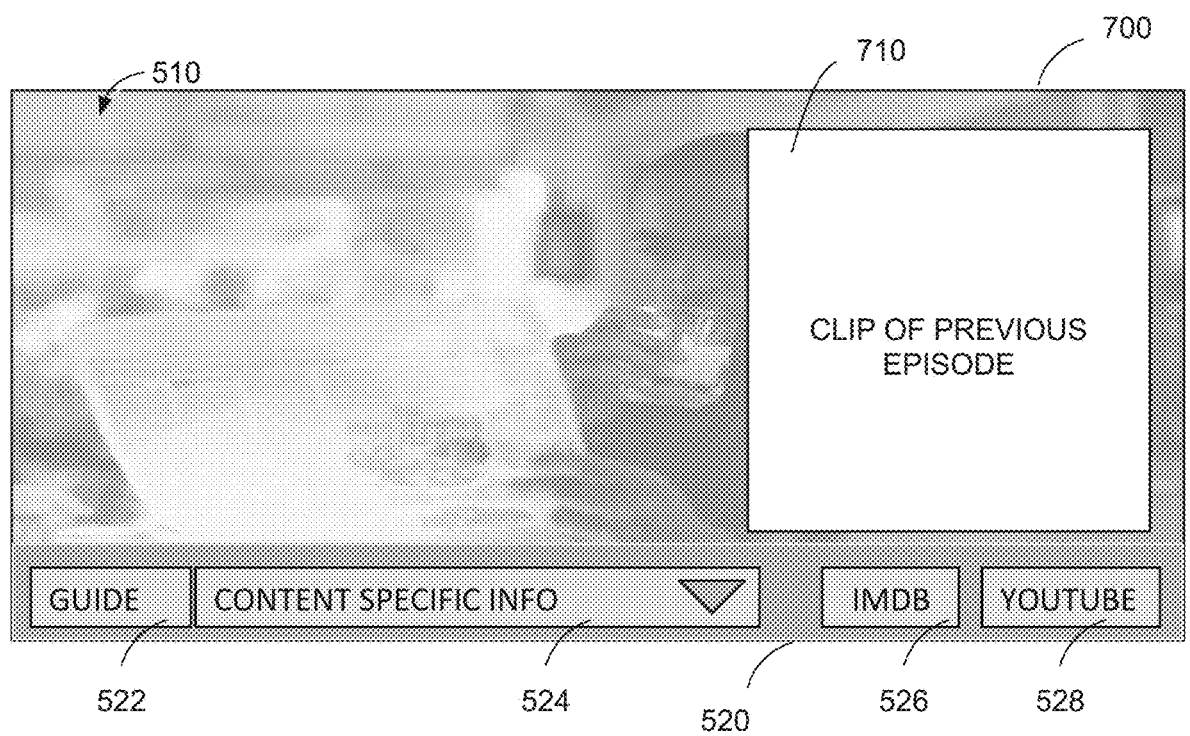
FIGS. 7A-7C are display diagrams illustrating actions performed by actionable elements, according to some example embodiments.

FIG. 7A is a display diagram that depicts an example presentation of supplemental video content. The display diagram includes a display environment 700 that displays the video content 510 along with the actionable element 520 of FIG. 5A. In response to a viewer selection of the user-selectable option 528, the actionable element engine 150 retrieves a clip of a previous episode of the video content 510, and presents a user interface 710 within the display environment 700 that presents the retrieved clip to the viewer.

Figure 7B:
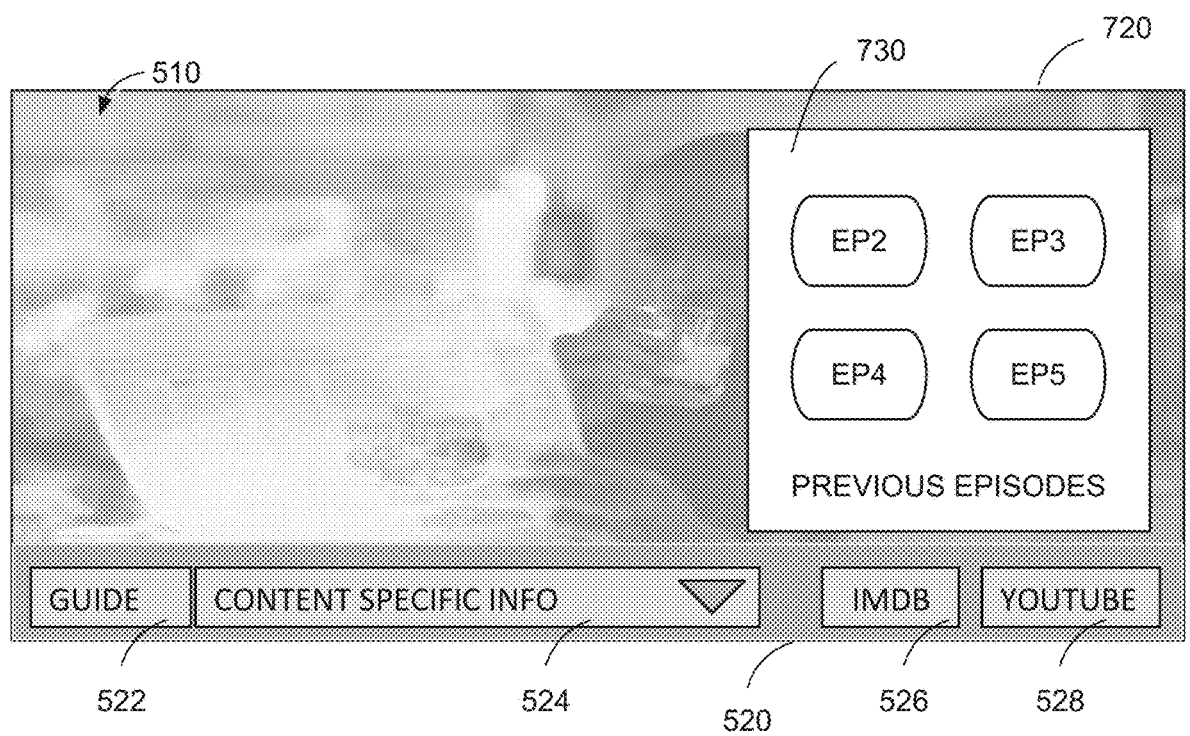

FIG. 7B is a display diagram that depicts another example presentation of supplemental video content. The display diagram includes a display environment 720 that displays the video content 510 along with the actionable element 520 of FIG. 5A. In response to a viewer selection of the user-selectable option 528, the actionable element engine 150 retrieves available clips of previous episodes of the video content 510, and presents a user interface 730 within the display environment 720 that presents the available clips (e.g., "EP2," "EP3") to the viewer.

Figure 7C:
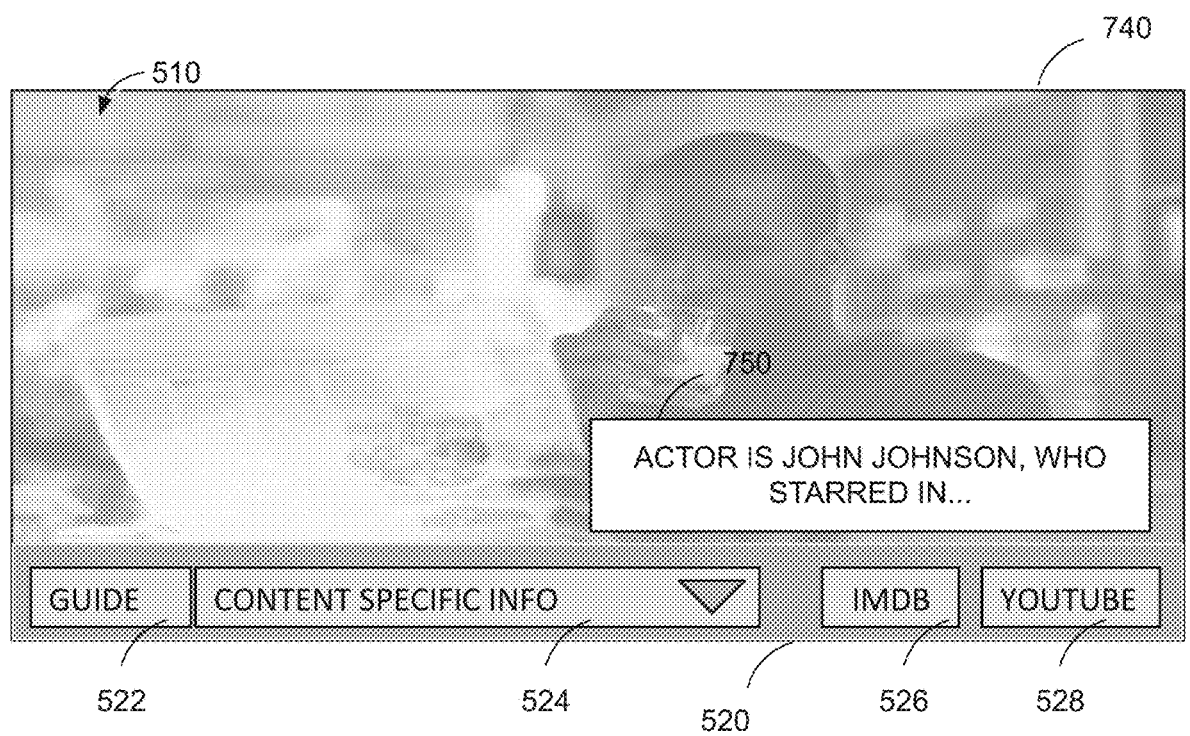

FIG. 7C is a display diagram that depicts an example presentation of information associated with playing content. The display diagram includes a display environment 740 that displays the video content 510 along with the actionable element 520 of FIG. 5A. In response to a viewer selection of the user-selectable option 526, the actionable element engine 150 retrieves information associated with the video content 510, and presents a user interface 750 within the display environment 740 that presents the information.

As described herein, the actionable element engine 150 may retrieve, obtain, and/or display various types of content and/or information based on the content (e.g., based on a location or frame within the content) that is playing within the display environment 135. For example, the actionable element engine 150 may facilitate and/or enable the following example scenarios:

A viewer of a television show wishes to watch another episode of the show, and selects a user-selectable option associated with supplemental videos, causing a user interface to be presented which provides access to other episodes of the show;

A viewer of a live football game wants to look up statistics of a certain player within the game, and selects a user-selectable option associated with information for the game, causing a user interface to be presented which provides statistics and other information for the game; and/or A viewer of streamed content (e.g., music videos or other limited duration video content) to a computing device via the Internet) may select a user-selectable option associated with information for the streamed content, causing a user interface to be presented which provides further information for the streamed content.

Of course, the actionable element engine 150 may facilitate and/or enable other scenarios.

Figure 8:
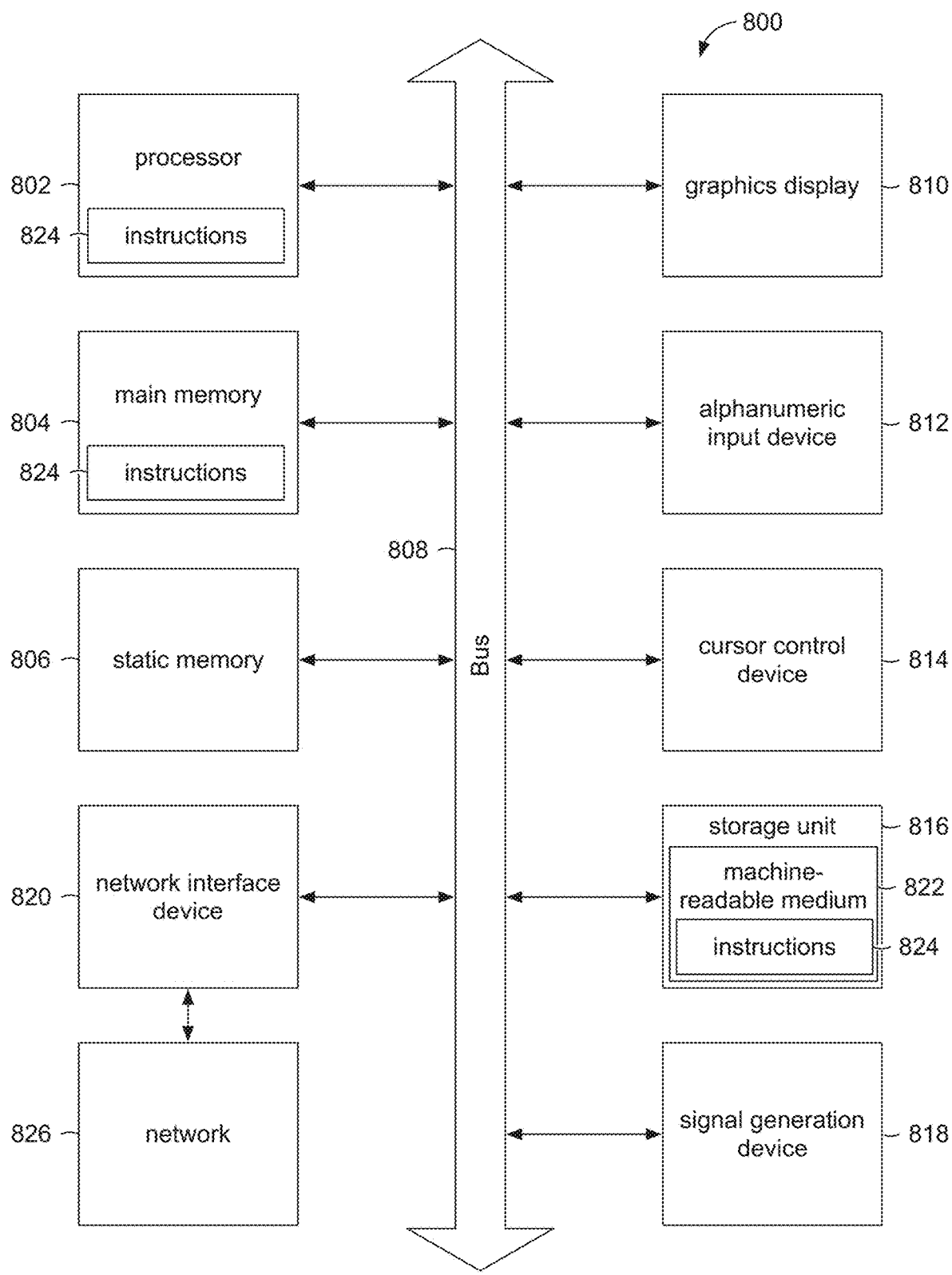
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer, a tablet computer, a laptop computer, a netbook, a set top box, a personal digital assistant, a cellular telephone, a smartphone, a web appliance, a network router, a network switch, a network bridge, or any machine capable of executing the instructions 824 (sequentially or otherwise) that specify actions to be taken by that machine 800. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), an LED display, an LCD, a projector, or a CRT). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 (e.g., network 120) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions 824 (e.g., software) for execution by the machine (e.g., machine 800), such that the instructions 824, when executed by one or more processors of the machine (e.g., processor 802), cause the machine 800 to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may, accordingly, configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
   accessing, by data processing hardware of a computer system, a content feed provided by a content provider to a playback device;
   fingerprinting, by the data processing hardware of the computer system, at least one frame of media content from the content feed to obtain a fingerprint;
   determining, by the data processing hardware of the computer system, a target overlay location within a display environment of the playback device at which to display overlay content over the media content, wherein the determining the target overlay location comprises:
      identifying an area within the display environment using the fingerprint, and
      based on the identifying, selecting the identified area within the display environment as the target overlay location at which to display the overlay content; and
   in response to determining the target overlay location at which to display the overlay content, causing, by the data processing hardware of the computer system, the playback device to display the overlay content at the target overlay location and over the media content.

2. The method of claim 1, further comprising identifying the media content,
   wherein the overlay content is based on the identified media content.

3. The method of claim 1, wherein the overlay content includes a targeted advertisement selected for the playback device based on context.

4. The method of claim 3, wherein the context comprises other media items consumed on the playback device.

5. The method of claim 3, wherein the context comprises a subscription associated with the playback device.

6. The method of claim 1, wherein the overlay content includes a user-selectable option that is selectable by way of an input device associated with the playback device.

7. The method of claim 1, wherein the overlay content has a configuration that is based on the target overlay location.

8. A non-transitory computer-readable storage medium, having stored thereon program instructions that, upon execution by a processor, cause performance of a set of operations comprising:
   accessing a content feed provided by a content provider to a playback device;
   fingerprinting at least one frame of media content from the content feed to obtain a fingerprint;
   determining a target overlay location within a display environment of the playback device at which to display overlay content over the media content, wherein the determining the target overlay location comprises:
      identifying an area within the display environment using the fingerprint, and
      based on the identifying, selecting the identified area within the display environment as the target overlay location at which to display the overlay content; and
   in response to determining the target overlay location at which to display the overlay content, causing the playback device to display the overlay content at the target overlay location and over the media content.

9. The non-transitory computer-readable storage medium of claim 8, wherein:
   the of operations further comprises identifying the media content, and
   the overlay content is based on the identified media content.

10. The non-transitory computer-readable storage medium of claim 8, wherein the overlay content includes a targeted advertisement selected for the playback device based on context.

11. The non-transitory computer-readable storage medium of claim 10, wherein the context comprises other media items consumed on the playback device.

12. The non-transitory computer-readable storage medium of claim 10, wherein the context comprises a subscription associated with the playback device.

13. The non-transitory computer-readable storage medium of claim 8, wherein the overlay content includes a user-selectable option that is selectable by way of an input device associated with the playback device.

14. A computer system comprising:
a processor; and
a non-transitory computer-readable storage medium, having stored thereon program instructions that, upon execution by the processor, cause performance of a set of operations comprising:
 accessing a content feed provided by a content provider to a playback device,
 fingerprinting at least one frame of media content from the content feed to obtain a fingerprint,
 determining a target overlay location within a display environment of the playback device at which to display overlay content over the media content, wherein the determining the target overlay location comprises:
  identifying an area within the display environment using the fingerprint; and
  based on the identifying, selecting the identified area within the display environment as the target overlay location at which to display the overlay content, and
 in response to determining the target overlay location at which to display the overlay content, causing the playback device to display the overlay content at the target overlay location and over the media content.

15. The computer system of claim 14, wherein:
the of operations further comprises identifying the media content, and
the overlay content is based on the identified media content.

16. The computer system of claim 14, wherein the overlay content includes a targeted advertisement selected for the playback device based on context.

17. The computer system of claim 16, wherein the context comprises other media items consumed on the playback device.

18. The computer system of claim 16, wherein the context comprises a subscription associated with the playback device.

19. The computer system of claim 14, wherein the overlay content includes a user-selectable option that is selectable by way of an input device associated with the playback device.

20. The computer system of claim 14, wherein the overlay content has a configuration that is based on the target overlay location.

* * * * *